June 22, 1948.   E. H. ALDEBORGH ET AL   2,443,880
DIAL GAUGE FOR MEASURING SMALL BORES
Filed April 5, 1946
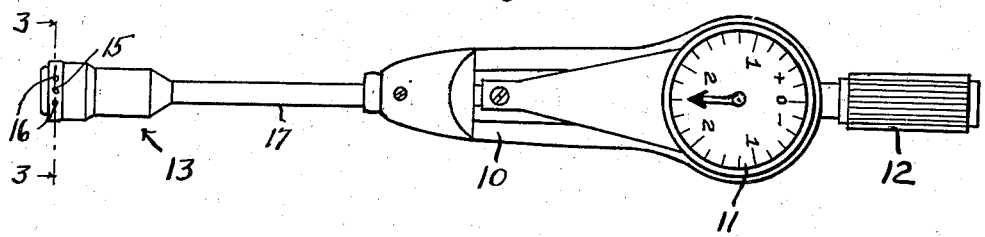
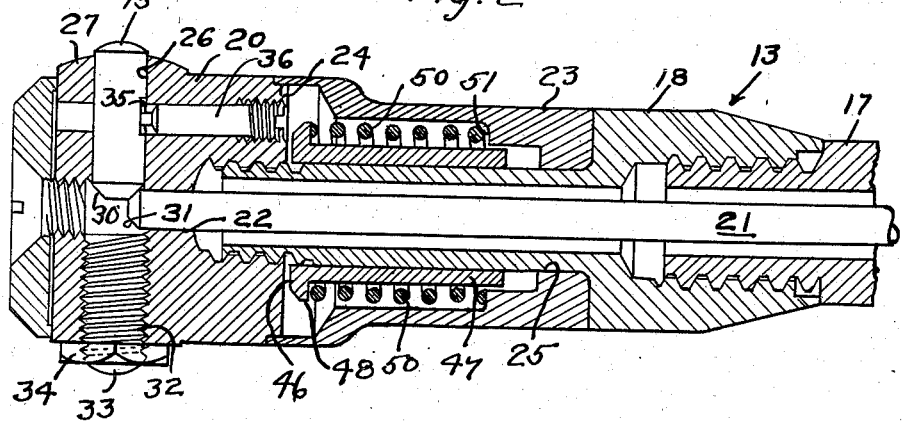
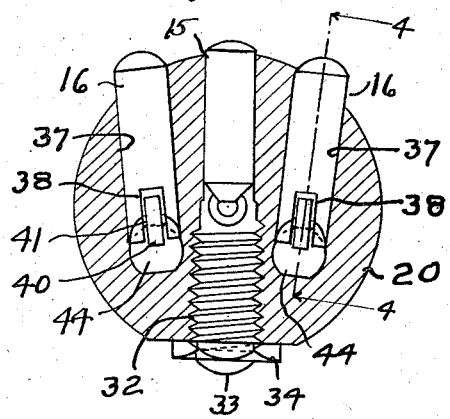
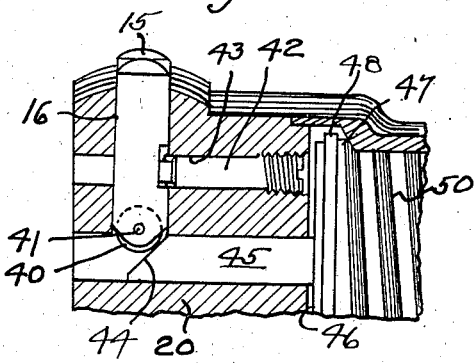
INVENTORS
Erik H. Aldeborgh
Alfred H. Emery
Earl M. Boat
John J. Bishop
BY Daly + Daly
ATTORNEYS.

Patented June 22, 1948

2,443,880

UNITED STATES PATENT OFFICE 2,443,880

DIAL GAUGE FOR MEASURING SMALL BORES

Erik Henry Aldeborgh, Poughkeepsie, Alfred Hamilton Emery, Wappingers Falls, and John J. Bishop and Earl M. Boat, Poughkeepsie, N. Y., assignors to Standard Gage Company, Inc., Poughkeepsie, N. Y., a corporation of New York Application April 5, 1946, Serial No. 659,760

3 Claims. (Cl. 33—178)

The present invention relates to a dial bore gage and particularly to such a gage which is adapted to measuring bores of relatively small diameter.

In the past, dial bore gages have been extensively used but have been used only in the larger sizes since the construction thereof was such as to make it substantially impossible to construct a gage which would measure bores of a diameter less than ⅝ of an inch. One form of construction of a dial bore gage which has been extensively used for the measurement of large bores is that shown in United States Patent No. 2,095,405, issued to Erik H. Aldeborgh on October 12, 1937. The gage of that patent illustrates a mode of centering which comprises utilizing radial pins, one on either side of the measuring plunger, which pins are spring pressed outwardly by a common spring so that the pressure forces the gage into position along a diameter of the bore measured and thereby causes the measuring plunger to be correctly located and to give an indication of the linear dimension of the diameter.

By our present invention we supply a dial indicator gage capable of measuring small bores and provided with centralizing pins similar to those of the patent above mentioned. The centralizing pins are so located and the spring means for pressing them outwardly is so constructed as to make the measurement of small bores possible and thus provide an instrument which heretofore has been greatly desired but has not been commercially feasible.

It is an object of our invention to provide a dial bore gage of the dial indicator type capable of measuring the internal diameter of bores of relatively small size.

It is another object of our invention to provide such a gage in which a means is provided to assure that the measurement will be taken along the diameter of the bore.

It is still another object of our invention to provide such a gage adapted to extremely accurate measurement and provided with means for extending the range of the instrument.

It is a further object of our invention to provide such a bore gage in which the dial indicator itself is a standard type of instrument.

Other objects and features of the invention will appear when the following description is considered in connection with the annexed drawing in which—

Figure 1 is a plan view of the dial bore gage of our invention;

Figure 2 is a fragmentary cross sectional view of the measuring element of the gage showing the details of construction thereof and particularly the details of the measuring plunger;

Figure 3 is a transverse cross sectional view of the gage of Figure 1 taken on the plane of the line 3—3 of Figure 1, showing particularly the construction of the centralizing plungers and the mode by which these plungers cooperate with a common spring means for pressing them outwardly against the bore walls; and Figure 4 is a fragmentary cross sectional view of the gage of our invention taken on the plane of the line 4—4 of Figure 3 showing in greater detail the mode of cooperation between the centralizing plungers and their common spring means.

Referring now to the drawings there is shown in Figure 1 the complete dial bore gage of our invention comprising the housing 10 in which is mounted a dial indicator 11 of a common midget type. The housing 10 is provided with a handle 12 and with a measuring unit 13 which measuring unit terminates in a somewhat enlarged end which carries the measuring plunger 15 as well as the centralizing plungers 16.

As will be seen in Figure 2, the measuring unit generally designated 13 consists of a sleeve 17 which extends into a bore in the housing 10 and is fastened therein as may be seen in Figure 1. Fixed to the sleeve 17 is another sleeve 18 and in turn fixed to the sleeve 18 is a cylindrical block 20. As is clearly seen in Figure 2, a plunger 21 extends through the sleeves 17 and 18 and is guided in a bore 22 in the block 20. This plunger extends into housing 10 and bears against the usual plunger of the dial indicator 11 so that any movement of the plunger 21 is effective to cause a corresponding indication on the dial indicator.

A sleeve member 23 extends between the sleeve 18 and block 20, being seated in a peripheral groove 24 in the block 20 and being held in position by virtue of the threading of the block 20 on the reduced extension 25 of sleeve 18. The block 20 is provided with a radial bore 26 located on the equator of a spherical portion 27 of the block 20. In this bore 26 there is inserted a measuring plunger 15 which at its inner end terminates in a right angle bevel 30 which cooperates with a similar right angle bevel 31 on the end of the plunger 21. Since plunger 21 is pressed outwardly, i. e., toward the left as seen in Figure 2, by means of the pressure inserted thereupon by the plunger of the indicator 11 the measuring plunger 28 is pressed outwardly and into contact with the walls of a bore during measuring operations.

Diametrically opposite the measuring plunger 15 there is a threaded bore in the block 20 in which a threaded stud 32 is positioned, this stud terminating in a spherically formed measuring button 33 and the stud being locked into an adjusted position by means of the lock or jam nut 34. By adjustment of the stud 32 in its threaded bore the gage may be adjusted to measure over a limited range and by replacing the stud 32 with one of greater length this range of measurement may be extended. In the particular gage which we have constructed in accordance with our invention a number of studs 32 are provided, one being adapted to measure dimensions in the range of from ⅜" to $\frac{7}{16}$", a second from $\frac{7}{16}$" to ½", a third from ½" to $\frac{9}{16}$", and the fourth in the range between $\frac{9}{16}$" and ⅝".

In order to retain the measuring plunger 15 in its bore 26 and to limit the movement thereof the plunger is provided with a flat surface 35 and a shouldered screw 36 is inserted into a tapped hole of the block 20 and bears against the flat 35. By this arrangement it is possible to readily assemble the plunger into the block and retain the plunger in the block while limiting the movement thereof.

As has been indicated it is necessary in a gage of this type, i. e., in a gage for measuring bores, that means be provided for assuring that the measurement taken is actually that of the diameter of the cylinder or bore being measured and not some chord of the cylinder. In order to accomplish this we provide a pair of centralizing plungers 16 each of which is located in a bore 37 in the block 20. These bores do not extend radially of the cylindrical block 20 but are at an acute angle to the diameter thereof and the bores are of considerably greater than radial length. Each of the plungers or pins 16 is provided at its innermost end with a slot 38 in which is mounted a roller 40, the roller being rotatable upon a shaft 41 extending through the pin on the opposite sides of the slot 38.

As was the case for the measuring plunger 15 the plungers 16 are limited in their range of movement by means of the shoulder screw 42 threaded into the bores 43 in the block 20 as is particularly seen in Figure 4. Rollers 40 bear against and cooperate with 45° angled faces 44 of rods 45 which extend generally longitudinally of the measuring head 13 and make contact at their right hand ends (as seen in Figure 4) with the terminating surface 46 of a collar 47. Collar 47 slides upon the extension 25 of the sleeve 18 and is spring pressed to the left as seen in Figures 2 and 4 by means of a coil spring 50, one end of which bears against the flange 48 of the collar 47 and the other end of which bears against a shoulder 51 on the interior of the sleeve 23.

Due to the construction above described the two plungers 16 are urged outwardly to the same extent by means of the spring 50 and upon insertion of the gage measuring head into a bore the plungers 16 cause the gage head to lie centrally of the bore so that the measurement taken by the measuring plunger 15 and the cooperating button 32 is along a diameter of the inscribed circle of the bore at the point of measurement. If, upon its first insertion, the head of the gage is not properly positioned in the bore, one plunger will make contact with the bore wall, and the spring pressure exerted by the spring 50 is pressed solely against that one plunger and consequently the gage is moved until the spring pressure is exerted equally on the two plungers 16. Since these two plungers are equally spaced from the plunger 15 it follows that when the spring pressure is thus equally exerted the measuring head of the gauge is properly located and the plunger 15 lies along a diameter of the bore.

It will be seen that due to the use of our construction the centralizing plungers need not be radial and the spring pressure may be exerted upon them without extending the radial dimension of the measuring head and therefore a bore gage is provided which is capable of measuring holes of lesser diameter than have previously been measured with a bore gage of this type.

While we have described a preferred embodiment of our invention it will be understood by those skilled in the art that our invention is capable of various modifications and we do not desire therefore to be restricted to the particular details shown and described but only within the scope of the appended claims.

What is claimed is:

1. In a dial bore gage of the type having a radial measuring plunger and cooperating centralizing plungers, in combination, a measuring head having a measuring plunger slidably mounted in a radial bore therein, means for transmitting radial movement of said measuring plunger at right angles thereto and along the axis of the measuring head to a dial indicator, a stud extending in alignment with said measuring plunger and radially of the measuring head, a pair of centralizing plungers slidably mounted in non-radial bores in said measuring head and one on either side of said measuring plunger, said centralizing and measuring plungers being co-planar, means for transmitting movement of said centralizing plungers longitudinally of said measuring head, a collar located co-axially in said measuring head and abutting said last mentioned means, and spring means for moving said collar into engagement with said last mentioned means to thereby spring press said centralizing plungers simultaneously outwardly against the walls of the bore.

2. In a dial bore gage of the type having a radial measuring plunger and cooperating centralizing plungers, in combination, a measuring head generally cylindrical in shape, a measuring plunger mounted in a radial bore in said measuring head, means for transmitting radial movement of said measuring plunger axially of said measuring head and to a dial indicator, a measuring stud located in a radial bore of said measuring head and on the same diameter as said measuring plunger, a pair of centralizing plungers located in non-radial bores in said measuring head and in the same transverse plane as said measuring plunger, said centralizing plungers being of greater length than the radius of said measuring head, movement transmitting pins located in longitudinal bores in said measuring head and extending into the bores in which said centralizing plungers operate, means for causing longitudinal movement of said motion transmitting pins upon inward and outward movement of the associated centralizing plungers, a collar slidable axially of said measuring head and bearing against the ends of said movement transmitting pins remote from said centralizing plungers, and a resilient member operating upon said collar for moving said movement transmitting pins to cause outward movement of said centralizing plungers, said resilient member being compressed upon inward movement of either one of said centralizing plungers, whereby the measuring head is caused to take a position in the bore such that the measuring plunger and its cooperating stud lie on a diameter of the inscribed circle of the bore.

3. In a dial bore gage of the type having a radial measuring plunger and cooperating centralizing plungers, in combination, a measuring head generally cylindrical in shape, a measuring plunger mounted in a radial bore in said measuring head, means for transmitting radial movement of said measuring plunger axially of said measuring head and to a dial indicator, a measuring stud located in a radial bore of said measuring head and on the same diameter as said measuring plunger, a pair of centralizing plungers located in non-radial bores in said measuring head and in the same transverse plane as said measuring plunger, said centralizing plungers being of greater length than the radius of said measuring head, movement transmitting pins located in longitudinal bores in said measuring head and extending into the bores in which said centralizing plungers operate, a roller mounted in the inner end of each of said centralizing plungers, an angular face on each of said movement transmitting pins, said faces cooperating with said rollers to move said pins longitudinally upon inward movement of said centralizing plungers, a collar located co-axially of said measuring head, said collar bearing aaginst the ends of said movement transmitting pins remote from said centralizing plungers, and spring means operating on said collar to force said centralizing plungers outwardly and into contact with the walls of a bore being measured.

ERIK HENRY ALDEBORGH.
ALFRED HAMILTON EMERY.
JOHN J. BISHOP.
EARL M. BOAT.

REFERENCES CITED

The following references are of record in the file of this patent:

UNITED STATES PATENTS

| Number | Name | Date |
|---|---|---|
| 2,030,244 | Cox | Feb. 11, 1936 |
| 2,095,405 | Aldeborgh et al. | Oct. 12, 1937 |
| 2,152,880 | Dowdy et al. | Apr. 4, 1939 |
| 2,253,803 | Newberry | Aug. 26, 1941 |
| 2,268,579 | Eisele | Jan. 6, 1942 |
| 2,325,996 | Eisele | Jan. 6, 1942 |
| 2,385,122 | Worthen | Sept. 18, 1945 |
| 2,424,497 | Nilsson | July 22, 1947 |

FOREIGN PATENTS

| Number | Country | Date |
|---|---|---|
| 415,971 | Germany | July 7, 1925 |
| 456,576 | Great Britain | Nov. 11, 1936 |